(12) United States Patent
Izumi et al.

(10) Patent No.: US 10,252,318 B2
(45) Date of Patent: Apr. 9, 2019

(54) DIE APPARATUS AND METHOD FOR BLANKING THIN PLATE

(71) Applicant: MITSUI HIGH-TEC, INC., Kitakyushu-shi, Fukuoka (JP)

(72) Inventors: Masahiro Izumi, Fukuoka (JP); Shinichiro Ono, Fukuoka (JP); Kenichi Takasaki, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 231 days.

(21) Appl. No.: 15/150,788

(22) Filed: May 10, 2016

(65) Prior Publication Data

US 2016/0332207 A1 Nov. 17, 2016

(30) Foreign Application Priority Data

May 14, 2015 (JP) ................. 2015-099083

(51) Int. Cl.
*B21D 45/00* (2006.01)
*B21D 28/02* (2006.01)
(Continued)

(52) U.S. Cl.
CPC .......... *B21D 45/006* (2013.01); *B21D 28/02* (2013.01); *B26D 7/025* (2013.01); *B26F 1/14* (2013.01);
(Continued)

(58) Field of Classification Search
CPC .... B21D 45/00; B21D 45/003; B21D 45/006; B21D 45/02; B21D 45/06; B21D 45/10;
(Continued)

(56) References Cited

U.S. PATENT DOCUMENTS 3,589,221 A * 6/1971 Deegan ................ B23D 31/008
83/41
3,673,902 A * 7/1972 Strobel ................... B21D 28/34
83/133
(Continued)

FOREIGN PATENT DOCUMENTS

CN  102764813  11/2012
CN  102770042  11/2012
(Continued)

OTHER PUBLICATIONS

Office Action issued in China Counterpart Patent Appl. No. 201610319463.3, dated Aug. 25, 2017, along with an English translation thereof.
(Continued)

*Primary Examiner* — Jason Daniel Prone
*Assistant Examiner* — Richard D Crosby, Jr.
(74) *Attorney, Agent, or Firm* — Greenblum & Bernstein, P.L.C.

(57) ABSTRACT

A die apparatus includes an upper die and a lower die used for blanking a thin plate, a stripper which is formed on the upper die and is arranged between the upper die and the lower die, and a punch which blanks a part of the thin plate. The stripper or the lower die is provided with a protruding part which reduces flexure of the stripper occurring when a test punching is performed by actuating the punch without the thin plate.

12 Claims, 7 Drawing Sheets

(51) Int. Cl.
*B26F 1/44* (2006.01)
*B26F 1/14* (2006.01)
*H02K 15/02* (2006.01)
*H01F 41/02* (2006.01)
*B26D 7/02* (2006.01)
*H02K 15/03* (2006.01)

(52) U.S. Cl.
CPC ............ *B26F 1/44* (2013.01); *H01F 41/0233* (2013.01); *H02K 15/02* (2013.01); *H02K 15/03* (2013.01); *B26F 2001/4463* (2013.01)

(58) Field of Classification Search
CPC .... B21D 28/00; B21D 28/06; B21D 28/0529; B21D 28/0534; Y10T 83/0529; Y10T 83/0534
See application file for complete search history.

(56) References Cited

U.S. PATENT DOCUMENTS

| | | | | |
|---|---|---|---|---|
| 3,995,469 A * | 12/1976 | Ames | ............... | B21D 37/08 72/328 |
| 4,036,056 A * | 7/1977 | Saunders | ............... | B21D 22/28 72/329 |
| 4,068,520 A * | 1/1978 | Carrieri | ............... | B21D 45/04 100/218 |
| 4,075,963 A * | 2/1978 | Crago | ............... | B21D 43/027 198/728 |
| 4,085,639 A * | 4/1978 | Marconi | ............... | B21D 45/00 83/157 |
| 4,370,878 A * | 2/1983 | Carrieri | ............... | B21J 13/14 72/345 |
| 4,791,458 A * | 12/1988 | de Masi | ............... | G03F 7/2014 355/53 |
| 4,839,952 A * | 6/1989 | Yokoyama | ............... | B21D 28/06 29/558 |
| 4,993,295 A * | 2/1991 | Dacey, Jr. | ............... | B21D 45/006 83/140 |
| 5,176,613 A * | 1/1993 | Cavlin | ............... | B26D 3/085 493/354 |
| 5,235,881 A * | 8/1993 | Sano | ............... | B21D 28/16 72/333 |
| 6,182,547 B1 * | 2/2001 | Bond | ............... | B21D 43/12 198/679 |
| 6,565,349 B1 * | 5/2003 | Tanaka | ............... | B21D 28/14 264/157 |
| 6,688,201 B1 * | 2/2004 | Dokyu | ............... | B21D 28/06 83/206 |
| 6,755,104 B2 * | 6/2004 | Grant | ............... | B21D 45/006 411/140 |
| 7,021,099 B2 * | 4/2006 | Bennett | ............... | B21D 26/055 72/344 |
| 7,055,353 B2 * | 6/2006 | Cowie | ............... | B21D 28/26 72/334 |
| 7,765,847 B2 * | 8/2010 | Michonski | ............... | B21D 45/02 72/344 |
| 8,225,702 B2 * | 7/2012 | Weigelt | ............... | B21D 45/00 83/139 |
| 8,375,834 B2 * | 2/2013 | Tosu | ............... | B21D 28/24 83/140 |
| 8,567,227 B2 * | 10/2013 | Cotter | ............... | B21D 37/12 248/580 |
| 9,021,852 B2 * | 5/2015 | Zhang | ............... | B21D 28/24 72/328 |
| 9,539,634 B2 * | 1/2017 | Komiya | ............... | B21D 28/14 |
| 9,630,233 B2 * | 4/2017 | Schlatter | ............... | H01M 8/0206 |
| 2003/0094242 A1 * | 5/2003 | Takeuchi | ............... | B26F 1/02 156/513 |
| 2004/0046012 A1 * | 3/2004 | Song | ............... | B21D 37/205 234/1 |
| 2012/0255410 A1 * | 10/2012 | Kido | ............... | B21D 53/022 83/202 |
| 2012/0297588 A1 | 11/2012 | Hasegawa | | |
| 2013/0019732 A1 * | 1/2013 | Yotsumoto | ............... | B26F 1/40 83/331 |
| 2013/0186245 A1 * | 7/2013 | Onishi | ............... | B21D 28/002 83/55 |
| 2016/0332207 A1 * | 11/2016 | Izumi | ............... | H02K 15/03 |

FOREIGN PATENT DOCUMENTS

| | | |
|---|---|---|
| CN | 203830549 | 9/2014 |
| JP | 59-166328 | 9/1984 |
| JP | 6-238361 | 8/1994 |
| JP | 7-24537 | 1/1995 |
| JP | 7-60377 | 3/1995 |
| JP | 10-296350 | 11/1998 |
| JP | 2001-001067 | 1/2000 |
| JP | 2000-260923 | 9/2000 |
| JP | 2001-352027 | 12/2001 |
| JP | 2003-103316 | 4/2003 |
| JP | 2007-283377 | 11/2007 |
| JP | 2011-41967 | 3/2011 |

OTHER PUBLICATIONS

Official Action received in JP 2015-099083, dated Dec. 27, 2018.

* cited by examiner

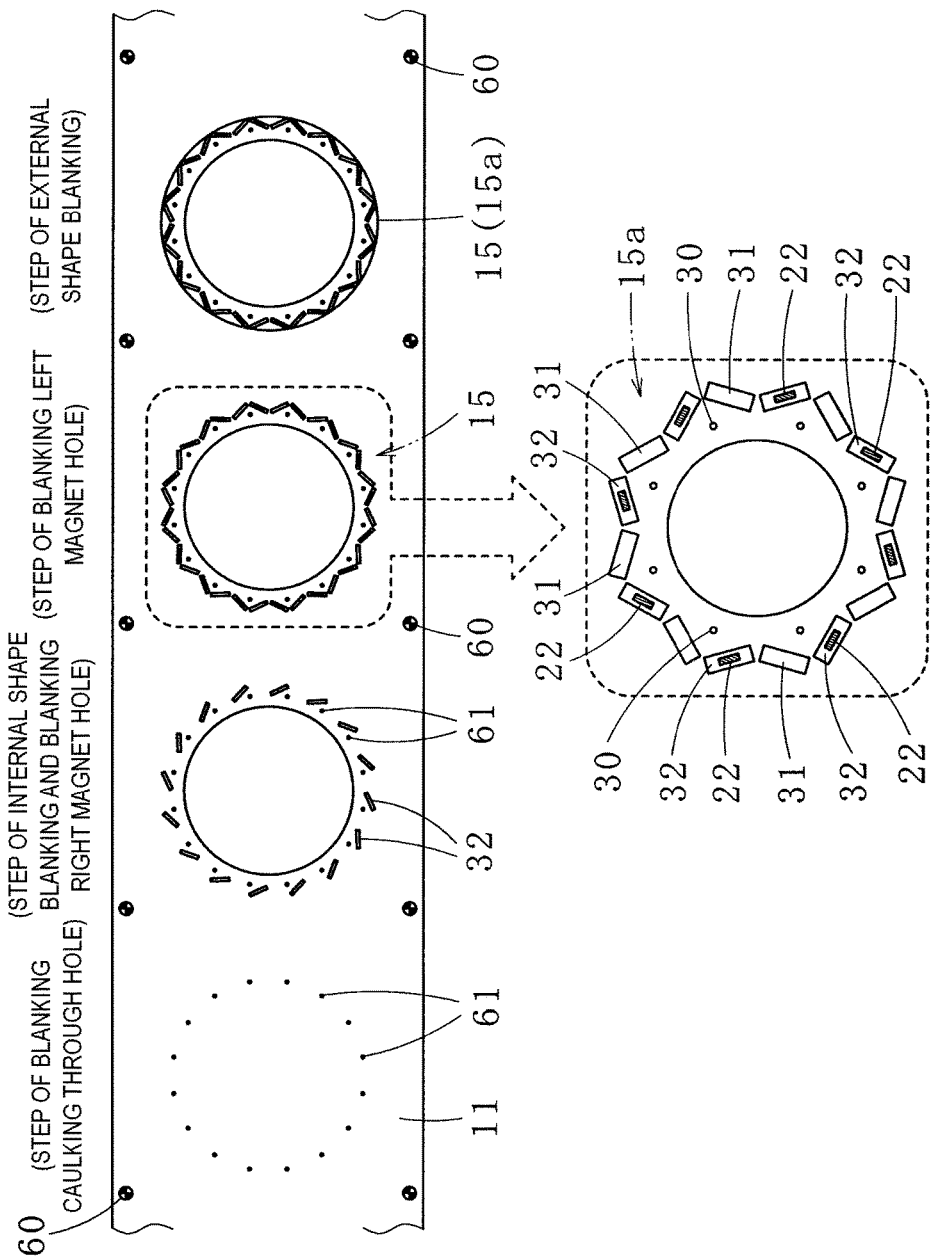

DIE APPARATUS AND METHOD FOR BLANKING THIN PLATE

CROSS REFERENCE TO RELATED APPLICATION(S)

This application is based upon and claims the benefit of priority of Japanese Patent Application No. 2015-99083 filed on May 14, 2015, the contents of which are incorporated herein by reference in its entirety.

BACKGROUND OF THE INVENTION

1. Field of the Invention

The present invention relates to a die apparatus used for blanking a thin plate, and a method for blanking the thin plate.

2. Description of the Related Art

Pressing equipment generally includes a pressing die (die apparatus) having an upper die with a punch fixed and held, and a lower die with a die fixed and held, the lower die arranged just under the upper die, and is constructed so that a component with a predetermined shape can be pressed or blanked by relatively moving (upwardly and downwardly moving) the upper die and the lower die in a vertical direction.

The pressing die further includes a stripper plate arranged between the upper die and the lower die, and a stripper holder for holding the stripper plate. Normally, the stripper plate and the stripper holder are collectively called a stripper.

In the case of use, by downwardly moving the upper die, a workpiece (for example, an electromagnetic steel plate) is pressed by the stripper and the die, and the plural punches are guided by the stripper plate, and the workpiece is pressed or blanked.

A press load of the stripper for pressing the workpiece described above is applied by an elastic force of a spring (spring) as described in, for example, JP-A-59-166328 as Patent Reference 1.

Since quality of blanking of the workpiece depends on variations in the press load of the stripper at the time of blanking, a spring is arranged so that a knockout load of a stripper 80 is applied to the inside (center side of a workpiece 82) of a stripper plate 81 in order to make a press load of the stripper 80 uniform as shown in FIG. 6. FIG. 6 also indicates a stripper holder 83 and a die 84 (lower die).

However, a press structure of the conventional stripper has the following problem.

In the case of air punching at the time of feeding a material etc., as shown in FIG. 7, since the workpiece 82 is not present between the stripper 80 and the die 84, a gap 85 is formed and when the stripper 80 is subjected to a press load, the stripper 80 flexes in the vicinity of the bottom dead center. Accordingly, a position of a punch 86 guided by the stripper 80 is displaced and also, the punch 86 bites into the die 84 (the punch 86 interferes with an inner surface of the die 84).

Consequently, chipping (a phenomenon in which an edged tool chips) occurs in both of the punch 86 and the die 84 due to the displacement of the position of the punch 86 and the bite into the die 84.

Particularly, the problem described above is remarkable in a step of forming a caulking protrusion (also called BEND).

Since the caulking protrusion is formed by half blanking the workpiece without completely blanking the workpiece, it is difficult to control the bottom dead center of the punch.

Hence, as described in JP-A-6-238361 as Patent Reference 2, a punch insert formed on the base side of the punch is butted on a back surface of the stripper plate in order to always maintain the position of the bottom dead center of the punch used for forming the caulking protrusion constant.

Patent Reference 1: JP-A-59-166328
Patent Reference 2: JP-A-6-238361

SUMMARY OF THE INVENTION

In the die configured as described above, the caulking protrusion is not formed by the press load, but is formed by the knockout load through the spring.

As a result, many springs are arranged in the periphery of the punch, and occurrence of flexure of the stripper is remarkable in the vicinity of a place in which the caulking protrusion is formed.

Also, when an external shape of a laminated iron core is large, or when the laminated iron cores are formed in multiple rows, a width (a width direction of the workpiece (a direction orthogonal to a feeding direction of the workpiece)) of the stripper is also large, with the result that the problem of the flexure is remarkable.

The present invention has been implemented in view of such circumstances, and a non-limited object of the present invention is to provide a die apparatus capable of reducing and further preventing flexure of a stripper in the case of air punching by a simple configuration, and a method for blanking a thin plate.

A first aspect of the present invention provides a die apparatus including: an upper die and a lower die used for blanking a thin plate; a stripper which is formed on the upper die and is arranged between the upper die and the lower die; and a punch which blanks a part of the thin plate, wherein the stripper or the lower die is provided with a protruding part which reduces flexure of the stripper occurring when a test punching is performed by actuating the punch without the thin plate.

The die apparatus may be configured such that the protruding part is provided on the stripper, and an arrangement position of the protruding part is set in a previously blanked region of the thin plate in plan view. The previously blanked region of the thin plate may be a dummy hole formed in an unnecessary region of the thin plate.

The die apparatus may be configured such that the protruding part is provided on the lower die, and the protruding part is projected and retracted from a surface of the lower die.

The die apparatus may be configured such that the die apparatus is used for forming a caulking protrusion of an iron core piece constructing a laminated iron core.

A second aspect of the present invention provides a method for blanking a thin plate using an upper die and a lower die after the thin plate is pressed on the lower die by a stripper formed on the upper die, the method including: providing a protruding part on the stripper or the lower die to reduce flexure of the stripper occurring when a test punching is performed by actuating a punch without the thin plate.

The method for blanking the thin plate may be processed such that the protruding part is provided on the stripper, and the protruding part is positioned in a previously blanked region of the thin plate. The previously blanked region of the thin plate may be a dummy hole formed in an unnecessary region of the thin plate.

The method for blanking the thin plate may be processed such that the protruding part is provided on the lower die, and the protruding part is projected from a surface of the lower die when the test punching is performed.

The method for blanking the thin plate may be processed by further including forming a caulking protrusion of an iron core piece constructing a laminated iron core.

A third aspect of the present invention provides a die apparatus including: an upper die and a lower die used for blanking a thin plate; a stripper which is formed on the upper die and is arranged between the upper die and the lower die; and a punch which is provided in the upper die and blanks a part of the thin plate, wherein the stripper includes a stripper plate which presses the thin plate between the stripper plate and the lower die and a stripper holder which holds the stripper plate, a recess is formed on the stripper holder and the stripper plate is installed in the recess of the stripper holder, a gap exists between a surface of the lower die and the stripper plate when the stripper holder contacts the lower die and a test punching is performed by actuating the punch without the thin plate, and the stripper plate or the lower die is provided with a protruding part which reduces flexure of the stripper occurring due to the gap when the test punching is performed.

The die apparatus and the method for blanking the thin plate according to the aspects of the present invention can reduce and further prevent the flexure of the stripper occurring in the test punching by using the punch without the thin plate (air punching) by the protruding part with which the stripper or the lower die is provided. Accordingly, for example, chipping of a punch and a die respectively included in the upper die and the lower die can be prevented and also, an advantage of the present structure of making a press load of the thin plate uniform can be maintained.

Particularly, when protruding part is provided on the stripper, by setting the arrangement position of the protruding part in the previously blanked region of the thin plate in plan view, the protruding part does not make contact with the thin plate even at the time of normal blanking (the time of blanking the thin plate).

Also, when the protruding part is provided on the lower die, by forming the protruding part capable of being projected or retracted from the surface of the lower die, a position in which the protruding part is formed is not limited, and flexibility in the position of installation can be increased.

Further, when the caulking protrusion of the iron core piece constructing the laminated iron core is formed by the die apparatus and the method for blanking the thin plate according to the aspects of the present invention, the present invention is applied to a situation in which occurrence of the chipping is remarkable, with the result that an effect of the present invention becomes more remarkable.

BRIEF DESCRIPTION OF THE DRAWINGS

In the accompanying drawings:
FIG. 2 is an explanatory diagram of a method for blanking a thin plate according to one embodiment of the present invention.

DETAILED DESCRIPTION OF THE EXEMPLARY EMBODIMENTS

Subsequently, an embodiment of the present invention will be described with reference to the accompanying drawings to understand the present invention.

Figure 1:
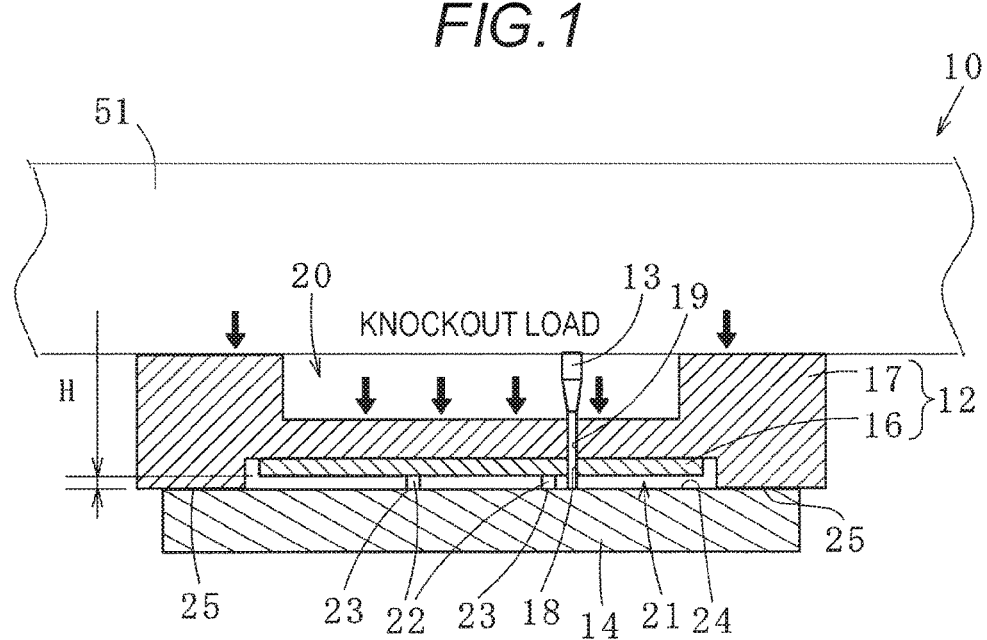
FIG. 1 is a sectional front view of a die apparatus according to one embodiment of the present invention.

As shown in FIGS. 1 and 2, a die apparatus 10 according to one embodiment of the present invention includes an upper die 51 and a lower die used for blanking a thin plate 11, and a stripper 12 which is formed on the upper die and is arranged between the upper die 51 and the lower die, and reduces and further prevents flexure of the stripper 12 in the case of air punching. The upper die also includes a punch 13 and a punch holder (not shown), and the lower die has a die 14 and a die holder (not shown). The air punching may be also referred to as a test punching by actuating the punch without thin plate 11. Hereinafter, description will be made in detail.

In the present embodiment, the die apparatus 10 is applied to manufacture of a rotor laminated iron core (rotor) as shown in FIG. 2.

In addition, in manufacture of the rotor laminated iron core, a steel plate (thin metal sheet) made of, for example, an amorphous material or an electromagnetic steel plate with a thickness of about 0.10 to 0.5 mm is used as the thin plate 11, and one iron core piece 15 and plural iron core pieces 15$a$ blanked from this steel plate are laminated, and the plural mutual iron core pieces 15$a$ and the mutual iron core pieces 15, 15$a$ adjacent in a lamination direction are joined by caulking bonding.

The stripper 12 shown in FIG. 1 is formed on the upper die through a spring (not shown).

A stripper plate 16 and a stripper holder 17 constructing this stripper 12 are respectively formed with through holes 18, 19, and the punch 13 is guided by the through holes 18, 19.

The stripper holder 17 is formed in a cross section with an H shape, and the upper side and the lower side of the stripper holder 17 are respectively formed with recesses 20, 21 having recessed-shaped cross sections.

This recess 20 of the upper side is formed in order to obtain space for a punch plate (not shown) for supporting the punch 13 and a punch backing (plate for receiving a surface pressure in the case of blanking the thin plate 11) arranged in the back of this punch plate. Accordingly, upsizing of the upper die can be prevented (the thickness can be thinned).

Also, the stripper plate 16 is installed in the recess 21 at the lower side of the stripper holder 17.

Since the center of the stripper holder 17 in a width direction (direction orthogonal to a conveyance direction of the thin plate 11) is thinner than both sides of the stripper holder 17 in the width direction in this manner, the stripper holder 17 tends to flex in the case of air punching of the die apparatus 10 (in the absence of the thin plate 11), with the result that the stripper plate 16 also tends to flex.

In addition, even when the thickness of the stripper holder is substantially the same throughout the width direction, the stripper holder tends to flex still when the stripper holder becomes wide, for example, as in the case of the manufactured rotor laminated iron core (iron core piece) with a large diameter, or the case of forming the iron core pieces in multiple rows from the thin plate.

Consequently, chipping tends to occur in both of the punch 13 and the die 14 as described above.

Because of this, the lower side of the stripper plate 16 is provided with a protruding part 22.

In the case of air punching, a lower surface 23 of the protruding part 22 partially abuts on an upper surface 24 of the die 14 to thereby reduce flexure of the stripper 12 occurring in the case of the air punching.

A height H of this protruding part 22 is equal to a distance of a gap formed in the case where lower surfaces 25 of both sides of the stripper holder 17 abut on the upper surface 24 of the die 14. However, as long as the height H is in the range capable of preventing the chipping described above, the height H can also be made smaller or larger than the distance of the gap.

Here, the case where height H of the protruding part 22 is made smaller than the distance of the gap refers to the case where the height H is, for example, 85% or more, further 90% or more (but less than 100%) of the distance of the gap. In this case, in the case of air punching, the lower surfaces 25 of both sides of the stripper holder 17 make contact with the upper surface 24 of the die 14 before the lower surface 23 of the protruding part 22 makes contact with the upper surface 24 of the die 14, with the result that a shock in the case where the protruding part 22 collides with the die 14 can be reduced and, for example, the life of the protruding part 22 can be increased.

Figure 6:
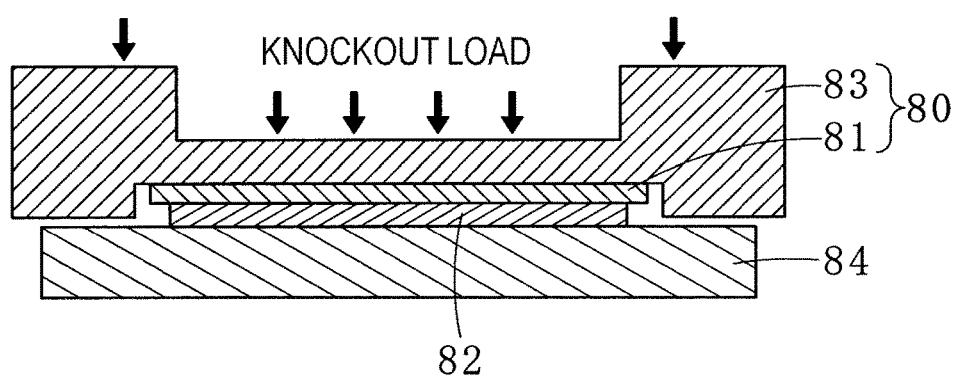
FIG. 6 is a sectional front view in a use state of a die apparatus according to a conventional example.
Figure 7:
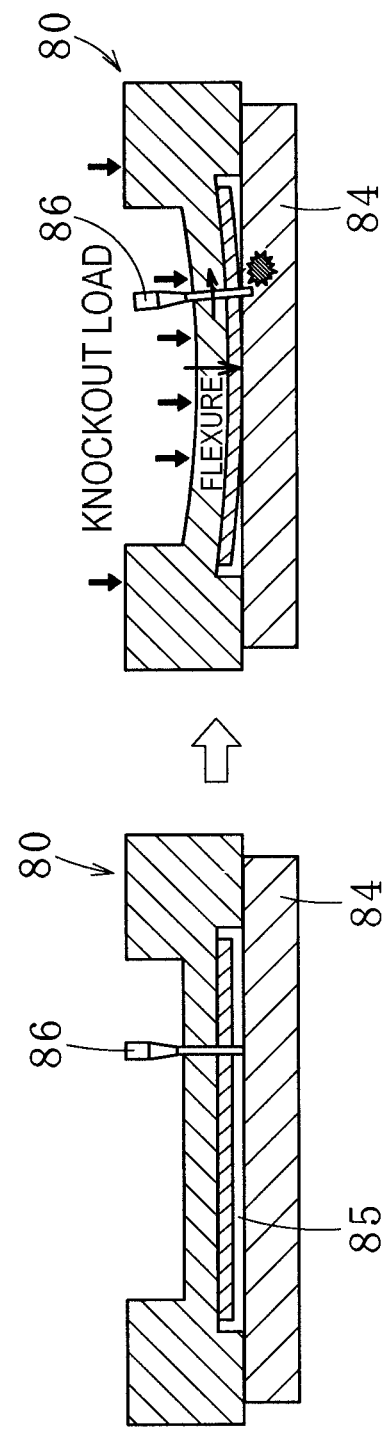
FIG. 7 is an explanatory diagram in the case of air punching of the die apparatus according to the conventional example.

Also, the case where height H of the protruding part 22 is made larger than the distance of the gap refers to the case where the height H is less than or equal to the thickness of the thin plate 11. In this case, a distance between the upper surface 24 of the die 14 and the lower surfaces 25 of both sides of the stripper holder 17 at the time of blanking the thin plate 11 is, for example, about 10 to 50 μm (see FIG. 6).

Figure 3A:
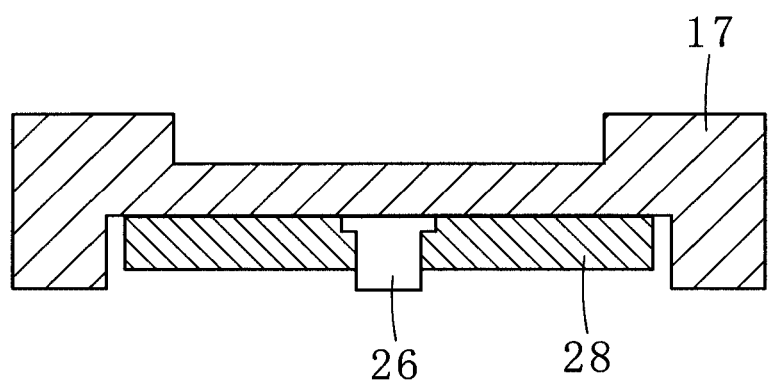
FIGS. 3A and 3B are sectional front views of die apparatuses according to first and second modified examples, respectively.
Figure 3B:
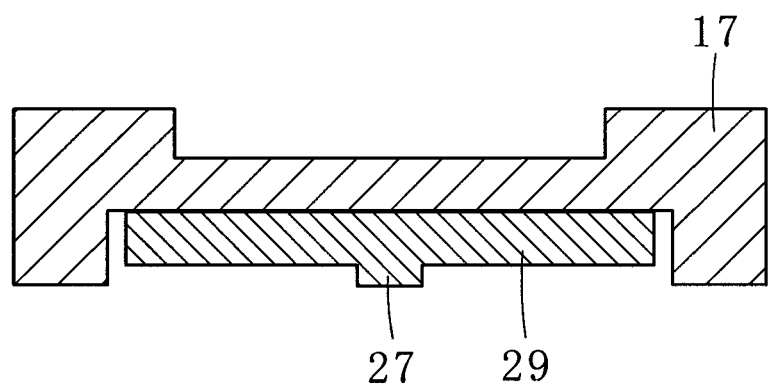

Alternatively, protruding parts 26, 27 shown in FIGS. 3A and 3B can be used instead of the protruding part 22 described above.

The protruding part 26 shown in FIG. 3A is attached to a stripper plate 28 as a core. Accordingly, for example, work of replacement of the protruding part 26 wearing out is facilitated.

The protruding part 27 shown in FIG. 3B is integrated with a stripper plate 29. In this case, the protruding part 27 is shaved at the time of molding the stripper plate 29. By integrating the protruding part 27 with the stripper plate 29 in this manner, stability of the protruding part 27 is increased.

When the stripper plate 16 is provided with the protruding part 22 (similarly, the protruding parts 26, 27) as described above, an arrangement position of the protruding part 22 is set in a previously blanked region of the thin plate 11 in plan view. Hereinafter, description will be made with reference to FIG. 2.

In addition, FIG. 2 illustrates each step of blanking the first iron core piece 15 of the iron core pieces 15, 15a constructing the rotor laminated iron core, and in a step of blanking the second iron core piece 15a or later, a step of forming a caulking protrusion and a step of blanking a left magnet hole are performed instead of a step of blanking a left magnet hole without performing a step of blanking a caulking through hole (forming a caulking through hole 61) in FIG. 2. This step is illustrated by an enlarged view of an arrow of a dotted line described in FIG. 2, but the shape is simplified for convenience of description.

The die apparatus 10 is used for forming a caulking protrusion 30 of the iron core piece 15a constructing the rotor laminated iron core. In addition, the iron core piece 15a is formed with left and right magnet holes 31, 32 formed in a V shape without apex (similarly, the iron core piece 15).

At the time of forming the caulking protrusion 30, the left (one) magnet hole 31 of the left and right magnet holes 31, 32 is also blanked (steps of forming the caulking protrusion and blanking the left magnet hole), and also in the previous step, an internal shape of the iron core piece is blanked and the right (the other) magnet hole 32 is blanked (steps of blanking the internal shape and blanking the right magnet hole).

Because of this, the right magnet hole 32 formed in the steps of blanking the internal shape and blanking the right magnet hole is set in a previously blanked region, and the protruding part 22 is arranged so as to be positioned inside the right magnet hole 32 in plan view.

Accordingly, in the case of actually blanking the left magnet hole 31, the protruding part 22 can be prevented from making contact with the thin plate 11.

In addition, the arrangement position of the protruding part is not limited to this position, and the protruding part can also be arranged so as to be positioned in the portion in which the internal shape is blanked in plan view.

Figure 4:
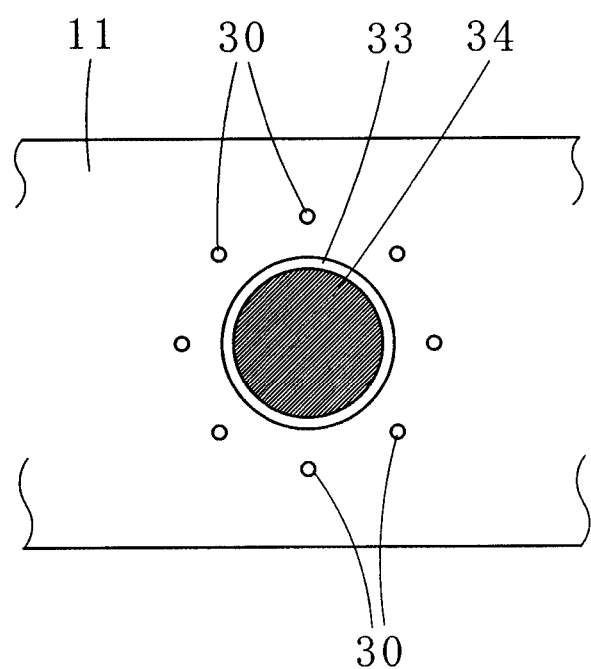
FIG. 4 is an explanatory diagram of a method for blanking a thin plate according to a modified example.

Alternatively, for example, as shown in FIG. 4, an unnecessary region (region unused as a product) of the thin plate 11 is formed with a dummy hole 33, and this region is set in a previously blanked region, and a protruding part 34 (having a function similar to the protruding part 22) with a circular cross section can be arranged so as to be positioned inside the dummy hole 33 in plan view.

In this case, by forming the dummy hole before an internal shape is blanked, the portion of the dummy hole can also be removed by the internal-shape blanking forming a product shape.

As described above, as long as flexure of the stripper plate can be reduced, any protruding part may be used, with the result that the arrangement position and the shape of the protruding part are not particularly limited, but the following configurations could be adopted in order to effectively reduce the flexure.

First, an area of contact between the protruding part and the die could be increased. This method includes, for example, a method for increasing the number of protruding parts arranged, or a method for increasing a cross-sectional area of the protruding part.

Also, the arrangement position of the protruding part could be set in the center of the stripper plate in a width direction. This is because the center of the stripper plate in the width direction is a region with the most flexure.

Figure 5:
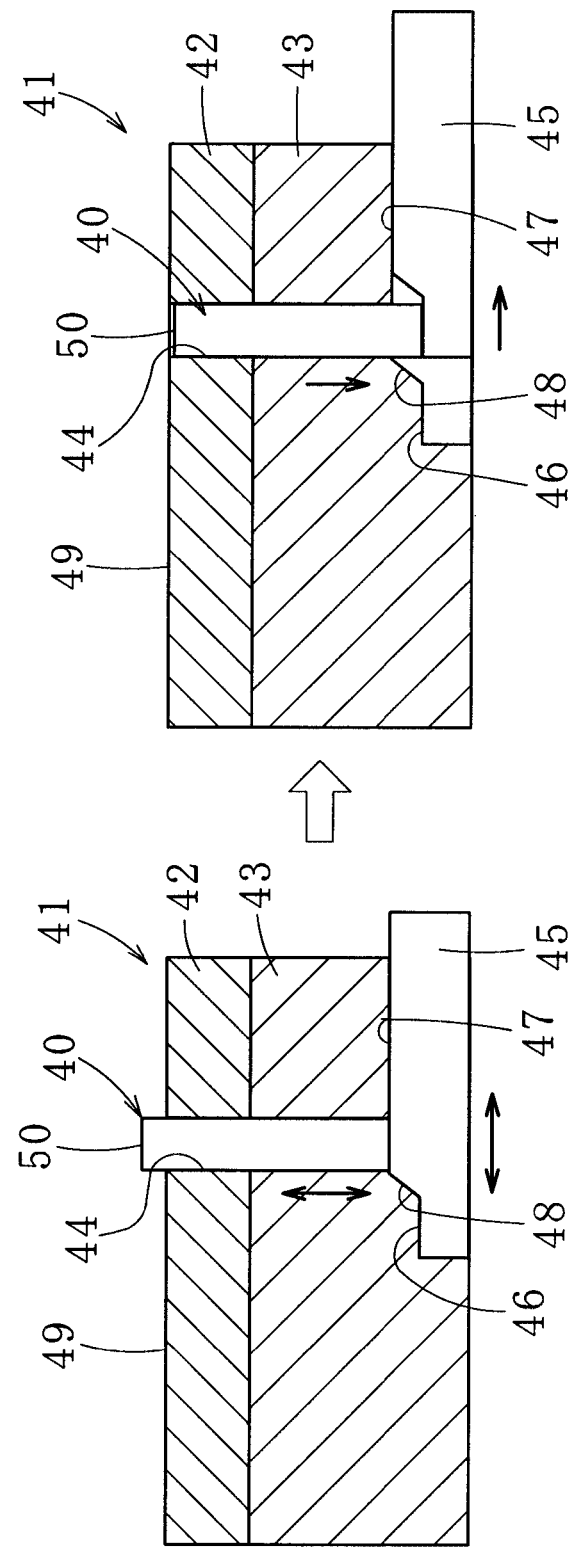
FIG. 5 is a sectional front view of a die apparatus according to a third modified example.

The stripper plates 16, 28, 29 are provided with the protruding parts 22, 26, 27 (similarly, the protruding part 34) shown above, but a die 41 can be provided with a protruding part 40 as shown in FIG. 5 instead or with addition.

The protruding part 40 is erected and arranged upwardly and downwardly movably inside a through hole 44 formed in a die plate 42 and a die shoe 43 constructing the die 41, and a lower part of this die shoe 43 is provided with an intermittent slide 45 slidable in a horizontal direction, the slide 45 with which the lower end of the protruding part 40 can make contact.

The intermittent slide 45 is formed with two upper surfaces 46, 47 having a step, and an inclined surface 48 is formed between the two upper surfaces 46, 47, and the lower end of the protruding part 40 can make contact with the upper surfaces 46, 47 and the inclined surface 48.

Accordingly, the protruding part 40 is upwardly and downwardly moved inside the through hole 44 according to height positions of the upper surfaces 46, 47 by moving the intermittent slide 45 in the horizontal direction, with the result that the protruding part 40 can be projected and retracted from a surface (upper surface) 49 of the die 41 (die plate 42).

Consequently, in the case of use, only in the case of air punching, an upper surface 50 of the protruding part 40 is partially abutted on a lower surface of a stripper plate (not shown) to thereby reduce flexure of a stripper occurring in the case of the air punching. In addition, a height in which the upper surface 50 of the protruding part 40 is projected from the surface (upper surface) 49 of the die 41 is equal to the height H described above.

When the die 41 is provided with a protruding part 40 in this manner, the protruding part 40 can be retracted to the die 41, with the result that a position in which the protruding part 40 is formed is not limited, and flexibility in the position of installation can be increased. In addition, when the height of the protruding part 40 is at a level at which the protruding part does not catch in the thin plate and does not obstruct conveyance of the thin plate in the case of conveying the thin plate, a structure of the intermittent slide 45 described above is not required (a state in which the upper surface of the protruding part is projected from the surface (upper surface) of the die is maintained).

Subsequently, a method for blanking the thin plate according to one embodiment of the present invention will be described with reference to FIG. 2.

FIG. 2 illustrates a method for manufacturing the rotor laminated iron core, and has a step of blanking a caulking through hole, a step of blanking an internal shape and blanking a right magnet hole, a step of blanking a left magnet hole (or a step of forming a caulking protrusion and blanking a left magnet hole) and a step of blanking an external shape. In addition, in each of the steps, die apparatuses for blanking predetermined shapes are respectively arranged, and the die apparatus 10 described above is arranged in the step of forming the caulking protrusion and blanking the left magnet hole.

At the time of feeding a material etc., each of the die apparatuses is actuated and air punching is performed without the thin plate 11.

At this time, in the step of forming the caulking protrusion and blanking the left magnet hole, the die apparatus 10 is used, with the result that the protruding part 22 formed on the stripper 12 can reduce and further prevent flexure of the stripper 12 occurring in the case of the air punching conventionally.

Next, the thin plate 11 is threaded and as described below, the thin plate 11 is sequentially blanked in each of the steps. In addition, in each of the steps, using each of the die apparatuses, the thin plate 11 is pressed on the lower die by the stripper formed on the upper die, and then is blanked using the upper die (punch) and the lower die (die).

(Step of Blanking Caulking Through Hole)

Here, the caulking through holes 61 are formed in the thin plate 11 previously formed with pilot holes 60 in both sides in the width direction. In addition, in this step, only the first step (with respect to a region in which the first iron core piece 15 is formed) is performed.

(Step of Blanking Internal Shape and Blanking Right Magnet Hole)

Here, with respect to the thin plate 11, the internal shapes of the manufactured iron core pieces 15, 15a are blanked and the right magnet holes 32 are blanked.

(Step of Blanking Left Magnet Hole or Step of Forming Caulking Protrusion and Blanking Left Magnet Hole)

Here, in a region in which the iron core piece 15 of the thin plate 11 is formed, the left magnet holes 31 are blanked, and in a region in which the iron core piece 15a is formed, the caulking protrusions 30 are formed and the left magnet holes 31 are blanked.

In addition, in the region in which the iron core piece 15a is formed, the protruding part 22 is positioned in a previously blanked region of the thin plate 11, that is, the right magnet holes 32 in this step, with the result that the protruding part 22 can be prevented from making contact with the thin plate 11.

(Step of Blanking External Shape)

Here, the iron core pieces 15, 15a are obtained by blanking the external shapes with respect to the thin plate 11.

In addition, one iron core piece 15 and the plural iron core pieces 15a whose external shapes are blanked are sequentially laminated, and the plural mutual iron core pieces 15a and the mutual iron core pieces 15, 15a adjacent in the lamination direction are joined by caulking bonding.

Consequently, the die apparatus according to the embodiment of the present invention and the method for blanking the thin plate can reduce and further prevent flexure of the stripper 12 in the case of air punching by a simple configuration.

The present invention has been described above with reference to the embodiment, but the present invention is not limited to the configuration described in the embodiment described above, and also includes other embodiments and modified examples contemplated within the scope of the matter described in the claims. For example, the case of constructing the die apparatus of the present invention and the method for blanking the thin plate by combining a part or all of the respective embodiments and the modified examples described above is also included in the scope of right of the present invention.

Also, the embodiment described above describes the case of applying the die apparatus and the method for blanking the thin plate to manufacture of the rotor laminated iron core, but is not limited to this case as long as the die apparatus is a die apparatus which blanks the thin plate and has the upper die, the lower die and the stripper, and the die apparatus can also be applied to manufacture of, for example, a stator laminated iron core (stator). In addition, the die apparatus of the present invention and the method for blanking the thin plate are particularly useful in the case of blanking the thin plate.

What is claimed is:

1. A die apparatus comprising:
   an upper die and a lower die configured to blank a thin plate;
   a stripper which is formed on the upper die and is arranged between the upper die and the lower die; and
   a punch extending along a punching axis thereof and configured to blank a part of the thin plate, wherein
   one of the stripper and the lower die is provided with a protruding part, wherein
   the protruding part protrudes in a direction of the punching axis from one of the stripper and the lower die so as to abut the other of the stripper and the lower die, thereby reducing flexure of the stripper when a test punching is performed by actuating the punch,
   the stripper and the lower die engaging to define a gap between an opposing surface of the stripper and an opposing surface of the lower die, and wherein, during test punching, the punch is configured to be actuated to extend across the gap in the direction of the punching axis.

2. The die apparatus according to claim 1, wherein the protruding part is provided on the stripper, and
the protruding part is configured to be set at a position of a previously blanked region of the thin plate.

3. The die apparatus according to claim 2, wherein the protruding part is configured to be set at the previously blanked region of the thin plate provided by a dummy hole formed in an unnecessary region of the thin plate.

4. The die apparatus according to claim 1, wherein the protruding part is provided on the lower die, and
the protruding part is projected and retracted from a surface of the lower die.

5. The die apparatus according to claim 4, wherein the protruding part is positioned within a through-hole of the lower die and is configured to move upward and downward within the through-hole with respect to the direction of the punching axis.

6. The die apparatus according to claim 1, wherein the die apparatus is configured to be used for forming a caulking protrusion of an iron core piece constructing a laminated iron core.

7. A method for blanking a thin plate using the die apparatus according to claim 1, comprising:
performing the test punching by actuating the punch without the thin plate.

8. The method for blanking the thin plate according to claim 7, further comprising:
providing the protruding part on the stripper, and
positioning the protruding part in a previously blanked region of the thin plate.

9. The method for blanking the thin plate according to claim 8, further comprising:
providing the previously blanked region of the thin plate as a dummy hole formed in an unnecessary region of the thin plate.

10. The method for blanking the thin plate according to claim 7, further comprising:
providing the protruding part on the lower die, and
projecting the protruding part from a surface of the lower die when the test punching is performed.

11. The method for blanking the thin plate according to claim 7, further comprising:
forming a caulking protrusion of an iron core piece constructing a laminated iron core.

12. A die apparatus comprising:
an upper die and a lower die configured to blank a thin plate;
a stripper which is formed on the upper die and is arranged between the upper die and the lower die; and
a punch which is provided in the upper die and is configured to blank a part of the thin plate, the punch extending along a punching axis thereof, wherein
the stripper includes a stripper plate which is configured to press the thin plate between a surface of the stripper plate and an opposing surface of the lower die and a stripper holder which holds the stripper plate,
a recess is formed on the stripper holder, wherein the stripper plate is mounted within the recess of the stripper holder,
a gap defined between the opposing surface of the lower die and the surface of the stripper plate when the stripper holder contacts the lower die and a test punching is performed by actuating the punch, and
one of the stripper plate and the lower die is provided with a protruding part that protrudes in a direction of the punching axis from one of the stripper and the lower die so as to abut the other of the stripper and the lower die, thereby reducing flexure of the stripper due to the gap when the test punching is performed,
wherein, during test punching, the punch is configured to be actuated to extend across the gap in the direction of the punching axis.

* * * * *